Jan. 17, 1961 M. M. REICHARDT 2,968,133
INVOLUTE GENERATING DEVICE AND INDEXING MECHANISM THEREFOR
Filed Nov. 23, 1956 7 Sheets-Sheet 1

INVENTOR.
Mayo M. Reichardt
BY
L. D. Burch
Attorney

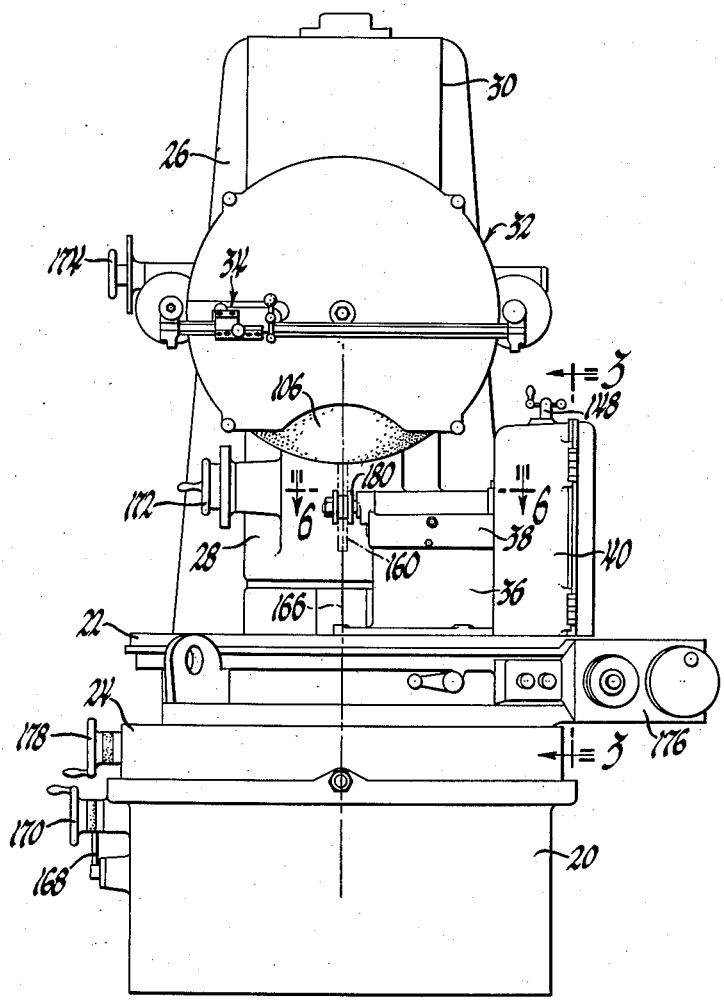

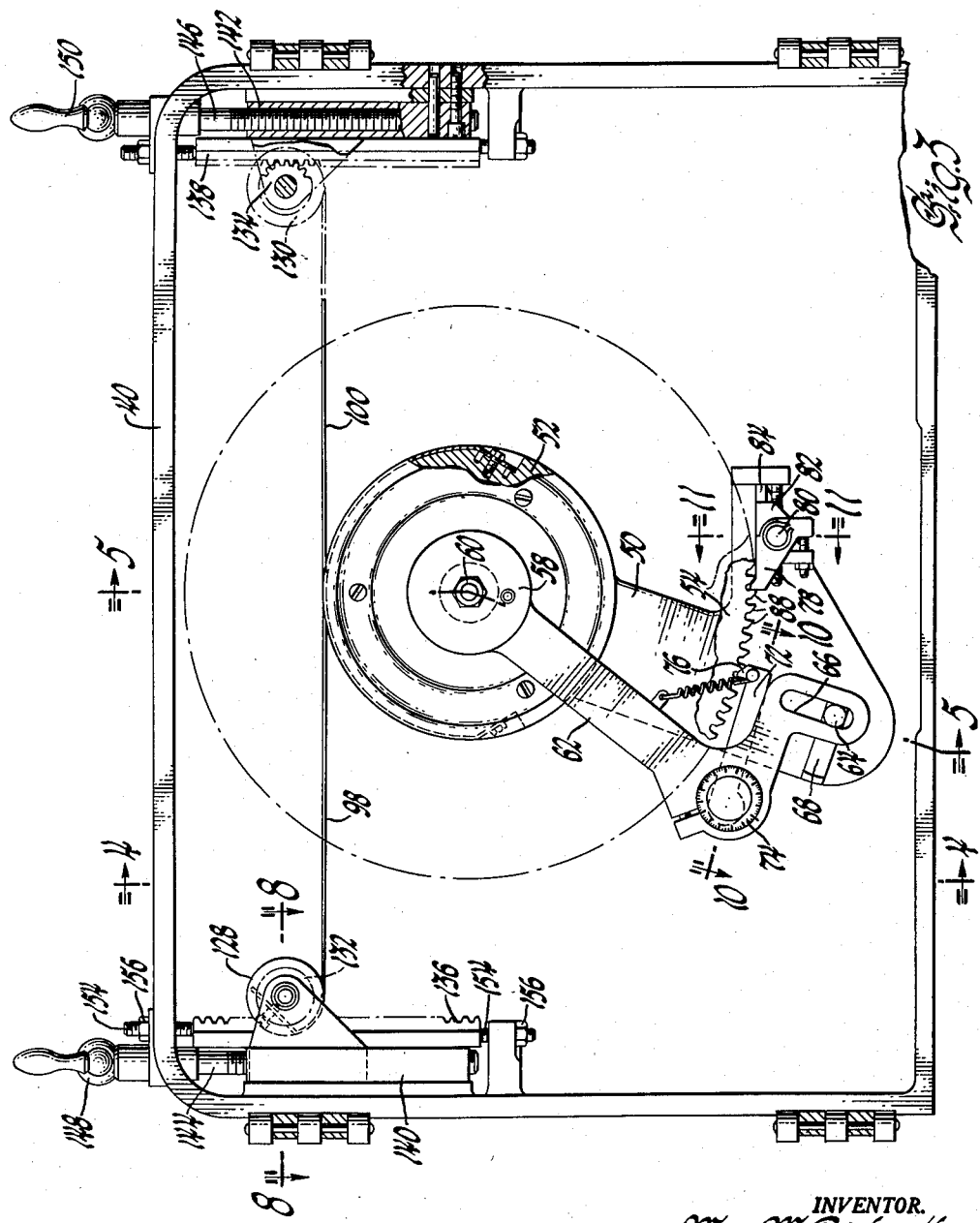

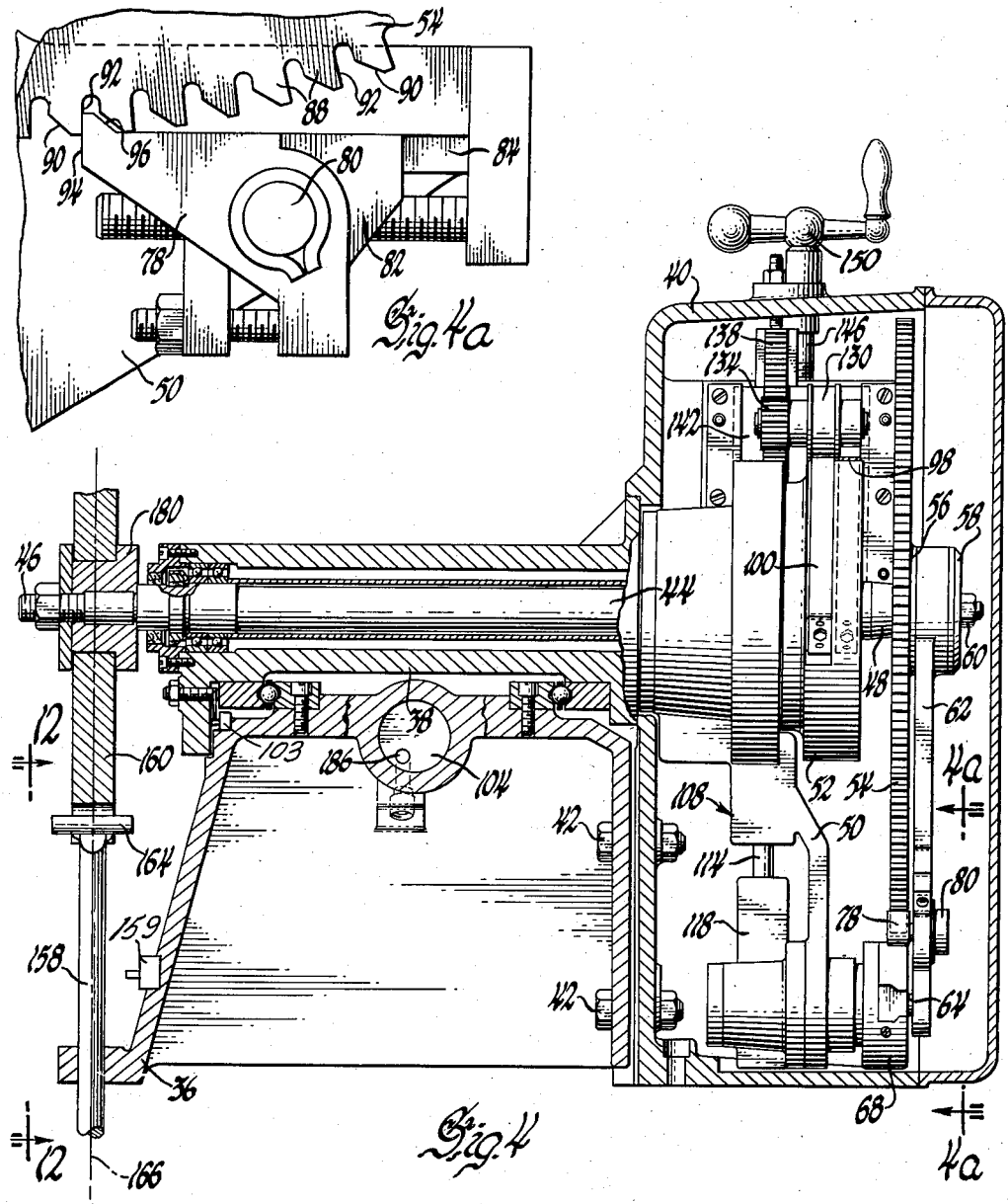

Jan. 17, 1961 M. M. REICHARDT 2,968,133
INVOLUTE GENERATING DEVICE AND INDEXING MECHANISM THEREFOR
Filed Nov. 23, 1956 7 Sheets-Sheet 6

INVENTOR.
Mayo M. Reichardt
BY
L. D. Burch
Attorney

Jan. 17, 1961   M. M. REICHARDT   2,968,133
INVOLUTE GENERATING DEVICE AND INDEXING MECHANISM THEREFOR
Filed Nov. 23, 1956   7 Sheets-Sheet 7
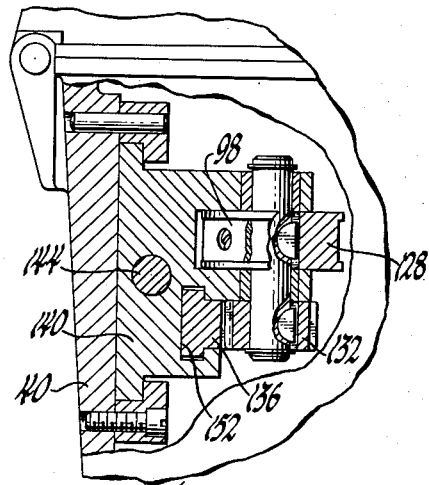
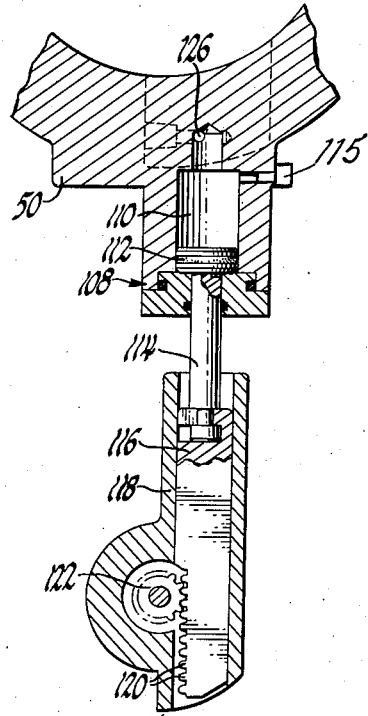
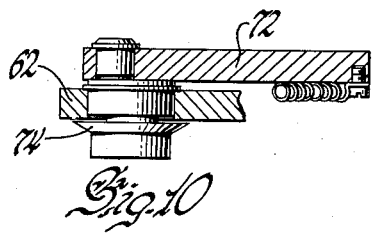
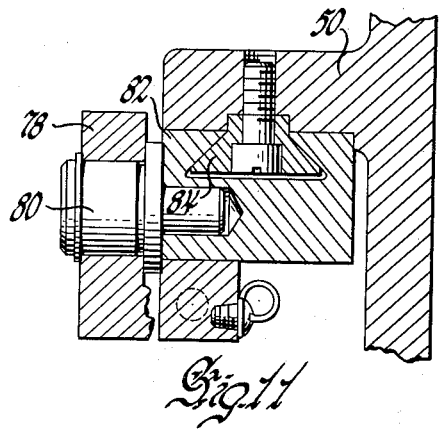
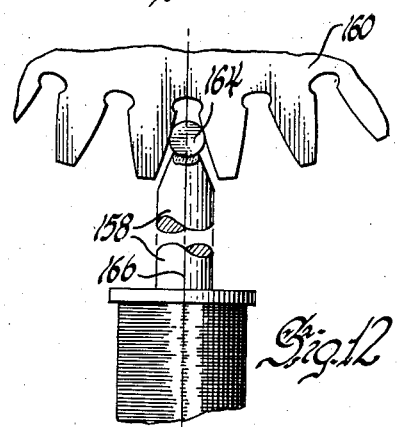
INVENTOR.
Mayo M. Reichardt
BY
L. D. Burch
Attorney Patented Jan. 17, 1961

2,968,133

INVOLUTE GENERATING DEVICE AND INDEXING MECHANISM THEREFOR

Mayo M. Reichardt, Milford, Mich., assignor to General Motors Corporation, Detroit, Mich., a corporation of Delaware Filed Nov. 23, 1956, Ser. No. 624,073

8 Claims. (Cl. 51—123)

The invention relates to an involute generating and indexing mechanism. An example of a machine embodying the invention is a gear cutter grinder which includes a tiltable grinding head, which may be raised or lowered, as well as a rotatable table and slide carriage. The involute is generated by use of the base circle tape roll principle. In the past when tape rolls were used to generate an involute, a set of tapes had to be provided for each different base circle diameter. This resulted in lost time during which the tapes, as well as the base circle drums, were exchanged. A storage problem was also presented. The machine embodying the invention provides for variable adjustment mounts for the tape rolls, thereby permitting the same set of tapes to be used with different base circle drums. A novel cutter indexing mechanism is provided which simplifies the indexing operation of the cutter being ground while maintaining desirable tolerances. Linear involute movement of the cutter relative to the grinding wheel is effected by the involute generating and cutter indexing mechanisms. Automatic controls are provided to give the required movement of the base circle drum and cutter spindle.

In the drawings:

Figure 2 is a front elevation of the machine of Figure 1 taken in the direction of arrows 2—2 of Figure 1;

Figure 3 is a view of a portion of the indexing mechanism taken in the direction of arrows 3—3 of Figure 2 and having parts broken away and in section;

Figure 4 is a cross-section view of the indexing mechanism of Figure 3 and the cutter positioning locator as viewed in the direction of arrows 4—4 on Figure 3;

Figure 4a is an enlarged view of the ratchet stop linkage taken in the direction of arrows 4a—4a of Figure 4;

Figure 8 is a view of a tape roll mount taken in the direction of arrows 8—8 on Figure 3 and having parts broken away and in section;

Figure 9 is a partial sectional view of a portion of the indexing mechanism taken in the direction of arrows 9—9 on Figure 5;

Figure 10 is a sectional view of a portion of the indexing mechanism taken in the direction of arrows 10—10 of Figure 3;

Figure 11 is a partial sectional view of the ratchet stop linkage of the indexing mechanism taken in the direction of arrows 11—11 on Figure 3;

Figure 12 is a view of a modified gear cutter position locating and gaging tool taken in the direction of arrows 12—12 on Figure 4.

Figure 1:
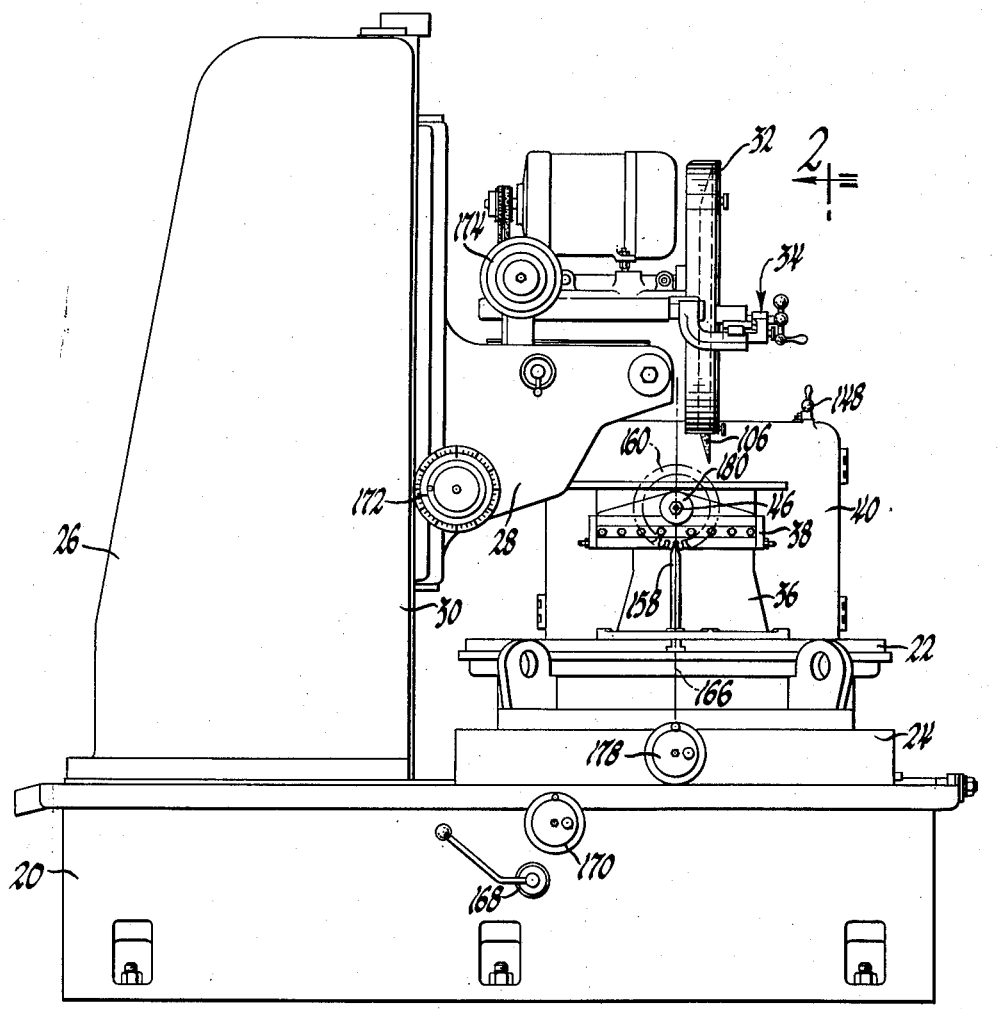
Figure 1 is a side elevation of a machine embodying the invention.
Figure 1A:
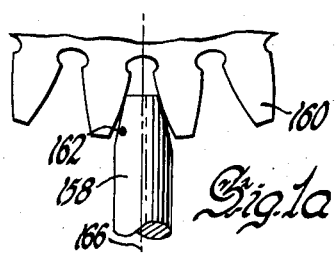
Figure 1a is an enlarged view of the gear cutter locating device of Figure 1.

The gear cutter grinding machine shown in Figure 1 is mounted on a base 20 and includes a rotatable table 22 and table mount 24 which is secured to the upper surface of the base. A support column 26 is also secured on the upper surface of the base 20 adjacent the rotatable table. This column slidably supports a vertical slide 28 along the perpendicular face 30 adjacent the rotatable table 22. A cutter grinder head and motor assembly 32 is supported on slide 28 and may be tilted in a vertical plane to control the gear cutter pressure angle. A grinder wheel dresser assembly 34 is also supported by vertical slide 28. The rotatable table 22 has a slide carriage support 36 secured thereto on which slide carriage 38 is supported for controlled sliding movement. Casing 40, which houses the indexing mechanism, is secured to one side of carriage support 36 by any suitable means such as bolts 42, as is best shown in Figure 4. Gear cutter spindle 44 is rotatably mounted in slide carriage 36 and extends beyond either side of the carriage, with one end 46 having provision for securing thereto the gear cutter to be ground. The other end 48 extends through the indexing mechanism casing 40 and supports a portion of the indexing mechanism within the casing.

The indexing mechanism includes an indexing arm 50 which is attached to a base circle drum 52 and is rotated therewith throughout the sector through which the base circle drum 52 normally rotates. The base circle drum is journaled on spindle 44 near its end 48. The indexing wheel 54 is formed with a hub 56 by which it is keyed to the end 48 of the spindle. A retainer plate 58 may be secured to the spindle 44 to hold the indexing wheel firmly in position. A stud or bolt 60 may be used for this purpose. The portion of spindle 44 extending through hub 56 is preferably tapered and the hub is formed with a mating taper to provide a secure locating mount for the indexing wheel. A control arm 62 is secured to spindle 44 through hub 56 and may rotate with the spindle.

Indexing arm 50 has a pin 64 received within a guide slot 66 formed within one end of control arm 62. Pin 64 is slidably mounted in a rotatable plate 68 which is driven by pinion shaft 70. When indexing arm 50 has reached one extreme limit of its movement, shaft 70 is rotated 180 degrees, causing pin 64 to move arm 62. An eccentrically mounted indexing pawl 72 is secured to control arm 62 and spring biased into engagement with indexing wheel 54. The eccentricity of pawl 72 may be adjusted as desired and is indicated on dial 74. A tooth 76 on the end of pawl 72 engages a tooth on the indexing wheel 54. When pin 64 is rotated through its 180 degree motion and arm 62 is moved by that motion, index pawl 72 has a linear motion imparted thereto along a line tangent to indexing wheel 54 at the point of contact of the wheel with tooth 76. This linear motion is to the left as shown in Figure 3. The linear distance through which pin 64 moves is calibrated to actuate the above-described linkage and move indexing wheel 54 a distance of one tooth. The eccentric mounting of pawl 72 provides an adjustment through which tooth 76 may be properly aligned with a tooth on the indexing wheel 54.

Indexing arm 50 also has a ratchet stop 78 pivoted on a stub shaft 80 which is secured to an adjustable slide 82. Indexing arm 50 has a slide support and guide 84 secured thereto along which slide 82 may be adjustably positioned. Slide 82 may be adjusted and locked in any desired position by any suitable means such as a threaded bolt and a lock nut. As is best shown in Figure 4a, each tooth 88 of indexing wheel 54 is provided with a profile having a beveled edge 90 forming a camming face on one side of the tooth. The other side of the tooth has a straight edge or face 92 which is along a radius line of the wheel. Ratchet stop 78 is provided with a mating straight edge or face 94 which engages the straight face 92 of the tooth to prevent indexing wheel 54 from rotating backwardly. Ratchet stop 78 also has a beveled edge 96 forming a camming face which is engageable with the beveled edge 90 of an adjacent tooth, allowing the ratchet to be cammed out of the space between the two teeth so that the indexing wheel may be indexed by the eccentrically mounted indexing pawl 72 as described above.

After the 180 degree revolution of pin 64 has indexed the wheel, the pin is then reversely rotated 180 degrees to its original position and moves arm 62 to its original position relative to indexing arm 50. This movement engages the radial straight edge 92 of one of the indexing wheel teeth 88 with the matching straight edge 94 of ratchet stop 78. This tooth stop arrangement requires that only the straight edge 92 of the indexing wheel teeth 88 be precision located for proper indexing since the stop is designed to engage only one edge of a tooth in position instead of both edges. Base circle drum 52 is rolled along involute generating tapes 98 and 100 and spindle 44 is then rotated to generate the involute to which the tooth is ground.

Limit switches 103 and 105 may be used to control the hydraulic motors 102 and 104 which move the slide carriage 38 in which spindle 44 is mounted. When carriage 38 has moved and the spindle 44 has rolled a sufficient distance to grind the entire face of the gear cutter tooth, a limit switch 103 may be actuated, causing the hydraulic motors 102 and 104 to reverse, and the grinding wheel 106 is extracted from the gear cutter by reverse movement of the slide carriage. In the process of extraction the grinding wheel may accomplish a finish grind operation on the face of the gear cutter tooth. After it is completely extracted, the indexing mechanism is again actuated, as described, to line up the next tooth to be ground.

Figure 5:
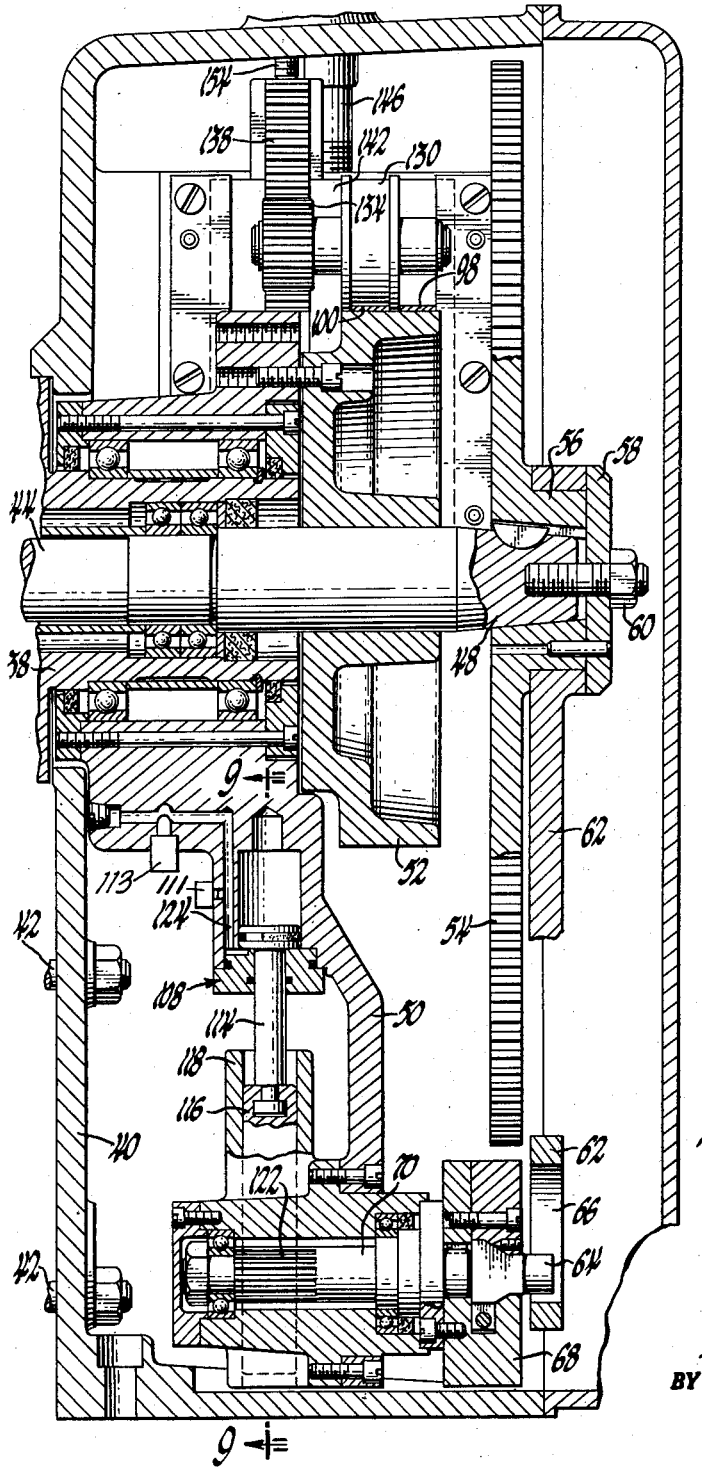
Figure 5 is an enlarged view of the indexing mechanism taken in the direction of arrows 5—5 on Figure 3 and having parts broken away and in section.
Figure 6:
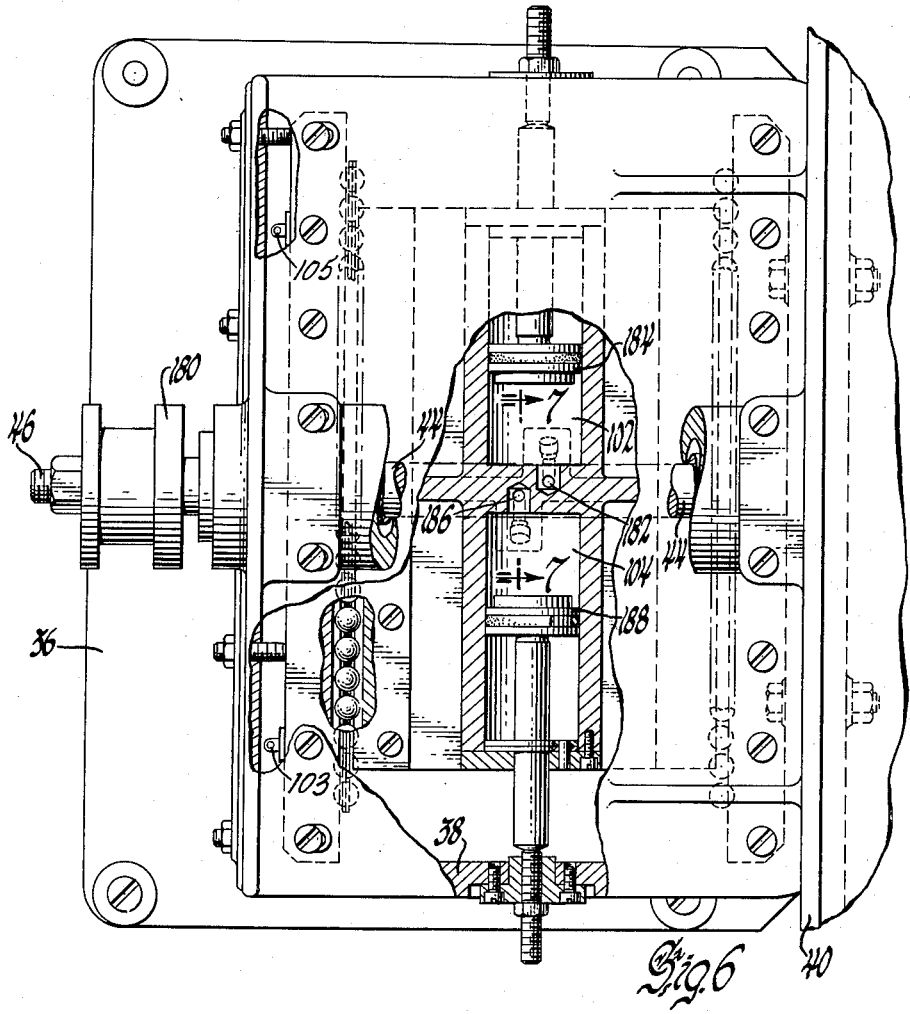
Figure 6 is a view of the slidable carriage as taken in the direction of arrows 6—6 of Figure 2, with parts broken away and in section.
Figure 7:
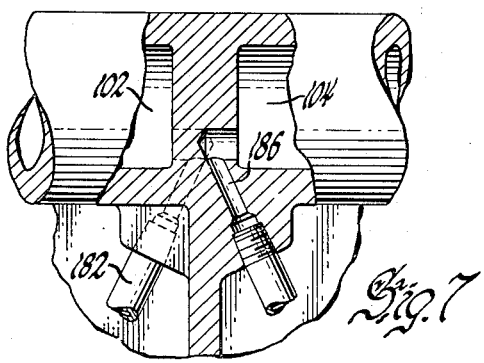
Figure 7 is an enlarged view of a portion of the carriage actuating cylinders taken in the direction of arrows 7—7 of Figure 6 and having parts broken away and in section.

A hydraulic loader 108 may be used to cause the two 180 degree revolutions of pin 64 through a rack and pinion arrangement which is shown in detail in Figures 5 and 9. Fluid pressure may be introduced into cylinder 110 on the lower side of piston 112 through passage 124, lifting piston 112 and piston rod 114 upwardly. Rack bar 116 is secured to the lower end of piston rod 114 and is pulled upwardly through rack guide 118 by the action of the hydraulic loader 108. Teeth 120 on the rack bar are in engagement with pinion 122 which is formed on pinion shaft 70. When rack bar 116 is moved, pinion 122 and shaft 70 are rotated an amount in proportion to the movement of the rack. Since rotatable plate 68 is attached to shaft 70 and pin 64 is eccentrically mounted in plate 68, the pin 64 is reciprocated in slot 66 and imparts movement to control arm 62. The stroke of piston 112 and the teeth on pinion 122 and rack bar 120 are so calibrated as to give a 180 degree rotary movement to shaft 70. When the hydraulic pressure is removed from the lower side of piston 112, pressure fluid is supplied to the upper side of piston 112 through passage 126 and the resulting force returns piston 112 to its lower position and causes pin 64 to reversely rotate 180 degrees to its original position.

By providing variable adjustment mounts for the tape rolls, the same set of tapes maybe used with different base circle drums. As is best shown in Figures 3 and 8 the vertical adjustment is provided so that the tapes 98 and 100 may be located on a line tangential to the top center point of the base circle drum 52. An additional take-up of the rack and pinion type is provided which is actuated automatically in conjunction with the vertical adjustment to roll the extra tape length on the tape roll when adjusting from a large base circle to a smaller base circle. This condition is created by the proper relative diameters of the tape rolls 128 and 130 and the pinions 132 and 134 which are attached to the respective tape rolls and respectively engaged by the control racks 136 and 138. The circumference of the tape roll is pi times the base circle circumference of the pinions.

Involute generating tapes 988 and 100 are wrapped part way around and secured to the base circle drum 52 as is shown in Figure 3, and are wound about and secured to tape rolls 128 and 130 which are mounted on opposite sides of the base circle drum. Travel nuts 140 and 142 permit vertical adjustment of the tape rolls for different base circles. Nuts 140 and 142 may be respectively positioned by screws 144 and 146, which are manually adjustable through handles 148 and 150. Travel nuts 140 and 142 may be slotted at 152, as shown in Figure 8 on nut 140, to receive control racks 136 and 138 therein. Control racks 136 and 138 are vertically positioned relative to the indexing mechanism casing 40 by any convenient means such as studs or bolts 154 and nuts 156.

Rotatable table 22 may have a gear cutter positioning device 158 extendable therethrough along its center line and movable to a position where it will contact the gear cutter 160 which is to be ground. The gear cutter, having an odd number of teeth, may be positioned with one tooth vertically upward by extending positioning device 158 into a space between two teeth on the bottom of the cutter. The vertical pin end 162 is so dimensioned as to fit tightly between the two gear cutter teeth and rotatably position the cutter. A limit safety switch 159 may be provided which prevents carriage movement until the device 158 is removed from the cutter tooth. A modification of the gear cutter positioning device is shown in Figure 12 in which dimension pin or ball 164 is of such size that in addition to locating a tooth in the vertical position, it may also be used as a mechanical type control to measure the involute before, during and after the grinding processes. Pin 164 may be located on the upper end of positioning device 158 and provide a simplified gage for the involute as well as a cutter positioning device. The center line 166 of the rotatable table extends through the axis of the gear cutter positioning device 158 and through the center of the gear cutter 160 being sharpened. Various gear cutter adapters 180 may be used to insure the center of cutter 160 being located on center line 166. If it is desirable to locate the upper tooth at a position other than vertical, device 158 may be positioned off centerline 166 to permit such location.

The various hand controls provided for operation of the machine include a vertical grinding wheel rapid traverse control 168 to move the slide 28 vertically under power; a vertical manual movement control 170 for the grinding wheel which may be very finely calibrated, e.g., on the order of 0.00001 inch graduations; a grinder head tilt control 172 which adjusts the grinder wheel for the proper pressure angle to be ground; a grinder wheel dresser feed adjustment 174; an electrically powered rotatable table control 176; a horizontal table adjustment control 178, and the external indexing mechanism controls previously described.

In order to grind a particular gear cutter, the proper gear cutter adapter 180 is chosen which will align the center of the gear cutter 160 with the center line 166 of the rotatable table. Since gear cutters of various thicknesses are common, different gear cutter adapters must be provided to allow for the thickness variations. The gear cutter positioning device 158 is extended upwardly and engaged in the space between two teeth of gear cutter 160. When the positioning device is pressed tightly against the teeth, it rotatably positions the cutter with a single tooth extending vertically upward on the upper side of the cutter, since the cutter has an odd number of teeth. The tooth extending upwardly is the tooth to be ground on the first operation. The tape rolls 128 and 130 have been vertically positioned relative to the appropriate base circle drum 52. The indexing mechanism has been properly adjusted as to the position of ratchet stop 78, the desired eccentricity of indexing pawl 72 and the proper stroke of pin 64. The grinder head 32 is tilted to provided for the proper pressure angle and is adjusted vertically to the desired height. The tooth 76 of indexing pawl 72 is engaged with a tooth on indexing wheel 54. Ratchet stop 78 is in engagement with a tooth on wheel 54 to hold that wheel in a proper position relative to the base circle drum. Slidable carriage 38 is positioned at the end of its stroke adjacent the grinder head support column 26. The position of the grinder head is shown in Figure 1 prior to the final adjustments on the grinder head which bring the grinder wheel 106 into the proper grinding position relative to gear cutter 160.

When the machine is actuated, fluid is fed through passage 182 to hydraulic cylinder 102 and the pressure against piston 184 in cylinder 102 moves slide carriage 38 to the right as shown in Figure 1. Movement of the slide carriage, which rotatably supports spindle 44, base circle drum 52 and the indexing mechanism, causes the base circle drum to roll along the tapes 98 and 100. Tape 98 rolls on base circle drum 52 while tape 100 rolls off the base circle drum. As the slide carriage and spindle have a linear motion imparted by the hydraulic cylinder 102 and piston 184, a rotary motion of the base circle drum is caused by action of the tape rolls. Indexing arm 50, being secured to the base circle drum, rotates with that drum, moving ratchet stop 78 therewith. Since the face 94 of ratchet stop 78 is in engagement with the face 92 of a tooth on indexing wheel 54, the indexing wheel is caused to rotate with the base circle drum in a clockwise direction as viewed in Figure 3, rotating spindle 44 and cutter 160 to generate an involute surface.

The indexing mechanism as shown in Figures 3 through 5 is in a position approximately half way along the path of this first linear movement of slide carriage 38. A limit switch 103 may be mounted on slide carriage support 36 and adapted to be engaged by the carriage upon sufficient linear movement thereof. The switch is actuated by the carriage at the end of the carriage advance stroke and controls the hydraulic pressure flow to cylinders 102 and 104. The fluid supply is cut off from cylinder 102 and that cylinder is opened to exhaust. At the same time fluid under pressure is directed to cylinder 104 through passage 186 and acts on piston 188 to reverse the movement of slide carriage 38. The reverse movement of slide carriage 38 causes base circle drum 52 to rotate in the opposite direction, taking up tape 100 and paying out tape 98. The slide carriage moves to its original position and the operation may be automatically repeated.

When the slide carriage reaches the end of its back stroke, it contacts a second limit switch 105 which cuts off the fluid pressure to cylinder 104, allowing the carriage to stop. The switch also directs the flow of pressure fluid through passage 124 to cylinder 110, causing piston 112 to move upwardly as shown in Figure 9. Rack bar 118 causes rotary motion of pinion 122 and in turn this motion is transmitted to the eccentric pin 64, causing that pin to rotate 180 degrees. The movement of pin 64 causes control arm 62 to move to the left, or clockwise, as shown in Figure 3, in advance of indexing arm 50. Since indexing pawl 72 has its tooth 76 engaged with indexing wheel 54, that wheel is moved with control arm 62 a distance determined by the position of indexing pawl 72. This distance is preferably calibrated to be slightly greater than the rotation required to advance one tooth of indexing wheel 54. Ratchet stop 78 is cammed out of engagement with the teeth on wheel 54 by action of the sloping faces 90 and 96.

A pressure switch 111 and a timer 113 may be located in the hydraulic circuit supplying cylinder 110 with fluid under pressure. When the piston 112 reaches the limit of its stroke, a pressure buildup follows and the pressure switch is actuated, allowing the lower end of the cylinder to be opened to exhaust. Should the pressure switch 111 fail to operate, the timer 113 will cut off the pressure fluid. Piston 112 will then be returned to its lower position by directing pressure fluid into the upper end of cylinder 110 through passage 126, moving rack bar 118 downwardly as shown in Figure 9. Pin 64 is reversely rotated 180 degrees through the action of pinion 122 and shaft 70. Control arm 62 is then moved counterclockwise relative to indexing arm 50 and indexing pawl 72, with its tooth 76, is cammed out of engagement with the teeth on indexing wheel 54. The tooth 76 is moved counterclockwise relative to indexing wheel 54 and engages the next tooth in the wheel. This rearward movement of the pawl 72 resulting in the camming action of the tooth 76 is sufficient to enageg and hold the surface 92 of a tooth on indexing wheel 54 against the surface 94 of ratchet stop 78, thus locking the indexing wheel in position. By use of this type ratchet stop, only one surface on each indexing tooth need be finished to close tolerances.

The advancement of the indexing wheel by one tooth rotates spindle 64 relative to the slidable carriage 38, causing the gear cutter 160 to be rotated one tooth and positioning the next tooth of the cutter in position to be ground on the next operation. Cutter 160 and index wheel 54 have the same number of teeth in order to move cutter 160 one tooth when indexing wheel 54 is moved one tooth.

A pressure switch 115 sensitive to the pressure buildup in cylinder 110 through passage 126 may be provided to actuate the slide carriage as described, repeating the operation. When one side of each of the cutter teeth is ground, the cutter may be reversed and the other side of each of the teeth may be ground.

The gear cutter grinding machine embodying the invention thus allows cutters to be reground to a desired involute with a minimum of lost set-up time for tape roll changes. It also maintains indexing accuracy with an improved indexing mechanism which automatically positions and moves the cutter being ground to generate the desired involute on each cutter tooth. While the invention has been illustrated in a gear cutter grinder, it may also be used in the manufacture of gears or other articles of manufacture, and is obviously not limited to gear cutter grinding machines.

What is claimed is:

1. Means for indexing a gear cutter to be ground, said means including a gear cutter spindle for mounting said cutter, a slidable carriage having said spindle rotatably mounted therein, involute generating mechanism including a base circle drum for generating involute surfaces on the teeth of said gear cutter, an indexing wheel non-rotatably secured to said spindle, a control arm rotatably secured to said wheel, an indexing arm non-rotatably secured to said base circle drum and supporting an eccentrically mounted pin therein, said pin being also received in a slot formed in one end of said control arm, means for imparting linear motion to said slidable carriage whereby said base circle drum is rotated, means for rotating said eccentrically mounted pin substantially at 180 degrees whereby said control arm is rotatably moved relative to said indexing arm, means on said control arm for advancing said indexing wheel relative to said base circle drum whereby said gear cutter is advanced, and a ratchet stop on said indexing arm for preventing reverse rotation of said indexing wheel whereby said gear cutter is held in an indexed position relative to said base circle drum.

2. In an involute generating mechanism for generating involute gear tooth profiles, a base circle drum and involute generating tapes, said tapes being secured to adjustable tape rolls, means for linearly adjusting said tape rolls whereby said tapes extend tangentially from substantially the same point on said base circle drum in opposite directions, and take-up means for said tapes whereby said tape rolls are automatically rotated to receive or discharge said tapes whereby said tapes are kept taut when said rolls are adjusted.

3. In a spindle indexing mechanism, an indexing wheel having circumferentially spaced teeth, a control arm rotatably mounted relative to said indexing wheel, an indexing arm rotatably mounted relative to said wheel and said control arm, means on said control arm for advancing said wheel relative to said indexing arm by a predetermined amount and a ratchet stop on said indexing arm for preventing reverse rotation of said indexing wheel and positioning said wheel relative to said indexing arm, said ratchet stop having a flat surface formed thereon extending substantially radially of said indexing wheel and adapted to engage only one of said teeth on said indexing wheel, each of said teeth having a substantially radially extending flat surface formed thereon and adapted to engage said ratchet surface whereby said wheel engages said ratchet at one surface only and is positioned relative to said indexing arm.

4. In a tape roll involute generating machine, means for adjusting said tapes including a vertically movable nut having a tape roll rotatably mounted thereon, said tape roll having a pinion secured thereto, and means for drivably rotating said pinion including a stationary rack in engaging relation with said pinion, said rack causing said pinion to rotate said tape roll upon vertical movement of said nut.

5. In combination in an indexing mechanism, an indexing wheel tooth having a single locating face and a camming face, a ratchet stop tooth having a single locating face and a camming face complementary to and engageable with said wheel tooth faces, said teeth cooperating to locate said wheel tooth in an indexed position when said locating faces are engaged, said camming faces being disengaged while said locating faces are engaged.

6. In combination in an indexing mechanism, an indexing wheel having a plurality of circumferentially spaced teeth, each of said teeth having a first face extending radially of said wheel and a second face tapered relative to said first face, a ratchet stop pivotally secured radially outward from said wheel and having a tooth adapted for meshing engagement with only one of said wheel teeth at a time, said ratchet tooth having a first face complementary with and adapted to engage said wheel tooth first face when said ratchet stop is in full engagement with said one wheel tooth and a second face complementary with said wheel tooth second face of a wheel tooth adjacent said one wheel tooth for camming engagement with said adjacent tooth when said wheel is forwardly rotated relative to said stop whereby said ratchet stop tooth is cammed out of meshing engagement with said wheel teeth, said ratchet stop tooth first face providing an indexed stop for said wheel upon reverse movement of said wheel.

7. In a machine tool having a workpiece support and indexing means for said support, said indexing means including an indexing arm and a control arm and an indexing wheel having said control arm secured thereto for rotation therewith, said wheel being secured to said support for rotation therewith, means including a base circle drum for generating an involute on said workpiece, said indexing arm being secured to said base circle drum for rotation therewith, power means carried by said indexing arm and engageable with said control arm for imparting indexing motion to said indexing wheel to index said support a predetermined arcuate distance relative to said indexing arm, and means for performing work on said workpiece whereby said involute is generated along a surface of said workpiece.

8. In a machine tool having a slidable carriage with a rotatable spindle mounted therein, indexing means for said spindle including an involute generating mechanism actuated by movement of said carriage, an indexing arm and a control arm for controlling movement of said indexing arm, an indexing wheel non-rotatably secured to said spindle, power means carried by said indexing arm and movably engageable with said control arm and including a fluid servo and an eccentric member operatively connected therewith, said control arm having movement imparted thereto relative to said indexing arm by said power means whereby said spindle is indexed by said wheel.

References Cited in the file of this patent

UNITED STATES PATENTS

| | | |
|---|---|---|
| 1,187,616 | Grannis | June 20, 1916 |
| 1,390,145 | Lees | Sept. 6, 1921 |
| 1,580,442 | Schurr | Apr. 13, 1926 |
| 2,088,687 | Carlsen | Aug. 3, 1937 |
| 2,176,924 | Olson | Oct. 24, 1939 |
| 2,187,062 | Sykes | Jan. 16, 1940 |
| 2,207,018 | Linse et al. | July 9, 1940 |
| 2,326,103 | Perkins | Aug. 3, 1943 |
| 2,326,368 | Kullman et al. | Aug. 10, 1943 |